United States Patent
Hustig

(10) Patent No.: US 7,705,921 B2
(45) Date of Patent: Apr. 27, 2010

(54) DIGITAL BTSC MULTI-CHANNEL TV SOUND DECODER CIRCUIT, AND DECODER COMPRISING SAME

(75) Inventor: Charles Hustig, The Villages, FL (US)

(73) Assignee: Asahi Kasei Microsystems Co., Ltd., Tokyo (JP)

( * ) Notice: Subject to any disclaimer, the term of this patent is extended or adjusted under 35 U.S.C. 154(b) by 1015 days.

(21) Appl. No.: 11/435,529

(22) Filed: May 17, 2006

(65) Prior Publication Data

US 2006/0262934 A1 Nov. 23, 2006

Related U.S. Application Data

(60) Provisional application No. 60/682,342, filed on May 18, 2005.

(51) Int. Cl.
*H04N 5/60* (2006.01)
*H04H 5/00* (2006.01)
(52) U.S. Cl. ................................ 348/738; 341/50
(58) Field of Classification Search ................ 348/738, 348/725, 552, 485, 486; 341/50
See application file for complete search history.

(56) References Cited

U.S. PATENT DOCUMENTS

| | | | | | |
|---|---|---|---|---|---|
| 5,357,284 | A | * | 10/1994 | Todd | 348/486 |
| 5,636,323 | A | * | 6/1997 | Umemoto et al. | 704/226 |
| 6,037,993 | A | * | 3/2000 | Easley | 348/485 |
| 6,281,813 | B1 | | 8/2001 | Vierthaler et al. | |
| 6,492,913 | B2 | | 12/2002 | Vierthaler et al. | |
| 6,807,676 | B1 | * | 10/2004 | Robbins et al. | 725/39 |
| 6,859,238 | B2 | * | 2/2005 | Wu | 348/738 |
| 7,468,763 | B2 | * | 12/2008 | Ying et al. | 348/738 |
| 2006/0262934 | A1 | * | 11/2006 | Hustig | 381/2 |

OTHER PUBLICATIONS

Federal Communications Commission. Multichannel Television Sound Transmission and Audio Processing Requirements for the BTSC System, OET Bulletin No. 60, Revision A, Feb. 1986.

* cited by examiner

*Primary Examiner*—Paulos M Natnael
(74) *Attorney, Agent, or Firm*—Vincent K. Gustafson; Intellectual Property/Technology Law

(57) ABSTRACT

A multi-channel TV sound signal decoding circuit for decoding multi-channel TV sound signals according to BTSC system specification, and a multi-channel TV sound decoder comprising such circuitry.

14 Claims, 2 Drawing Sheets

DIGITAL BTSC MULTI-CHANNEL TV SOUND DECODER CIRCUIT, AND DECODER COMPRISING SAME

CROSS REFERENCE TO RELATED APPLICATION

This application claims the benefit of priority of U.S. Provisional Patent Application No. 60/682,342, for "Digital BTSC Multi-Channel TV Sound Decoder Circuit, and Decoder Comprising Same" filed May 18, 2005 in the name of Charles Hustig.

BACKGROUND OF THE INVENTION

1. Field of the Invention

The present invention relates to circuitry for decoding multi-channel TV sound signals according to BTSC system specification, and to a multi-channel TV sound decoder comprising such circuitry.

2. Description of the Related Art

In the United States, the multi-channel television sound (MTS) system that is used for television broadcasting conforms to the Broadcasting Television System Committee (BTSC) standard (see OST Bulletin No. 60 (Revision A): Multi-channel sound transmission and audio processing requirements for the BTSC system (February 1986)). The MTS system is similar to the FM stereo system used in radio broadcasting, and involves a multiplex signal including a sum channel, a pilot tone, and a difference channel that is AM-modulated at twice the pilot frequency, with an additional monophonic channel (second audio program, or SAP, channel) being frequency-modulated at a center frequency of five times the pilot tone frequency. This composite signal is frequency-modulated before transmission. At the receiver, the demodulation process produces a parabolic noise power density at the output of the FM-demodulator, resulting in worse difference channel and SAP signals compared to the sum channel signal.

Excessive degradation of the difference channel and the SAP channel in the BTSC system is avoided by using a level- and frequency-dependent compression of these two sensitive channels at the transmitter; the expander inside the receiver must restore the original signal. The companding process, in which the signal is compressed on input and expanded back to its original form on output, attenuates the noise in silent periods; in loud periods, the noise is masked by the signal.

In prior analog expander circuitry employed in receivers, stereo channel separation adjustment involved a critical and time-consuming alignment procedure to minimize crosstalk. In the current implementation of digital circuitry, such adjustment is superfluous, since all functions behind the main FM demodulator in the BTSC system have been processed digitally. Digital decoder systems of illustrative conventional type are described in U.S. Pat. No. 6,281,813, and U.S. Pat. No. 6,492,913.

The digital implementations of the BTSC system that have been developed to date are based on a combination of an analog-to-digital converter (A/D converter) and a digital signal processor (DSP) as shown in the BTSC decoder system schematically illustrated in FIG. 1 (PRIOR ART). In the FIG. 1 system, the output signal of an antenna passes to the tuner. The tuner responsively generates a Sound Inter-carrier Frequency (SIF) signal, which is a carrier signal at a frequency of 4.5 MHz that is frequency-modulated with a Multi-channel Television Sound (MTS) signal. The SIF signal, as illustrated, then enters the digital frequency modulation demodulator unit and passes to the A/D converter, in which the SIF signal is converted to a digital SIF signal. The resultant digital SIF signal then is post-processed in the DSP of the digital frequency modulation demodulator unit, to produce a digital MTS signal.

Since the digital SIF signal is a frequency-modulated signal, it can be demodulated in various ways in the digital frequency modulation demodulator unit shown in FIG. 1.

In one exemplary digital FM demodulation arrangement, schematically illustrated in FIG. 2 (PRIOR ART), the output of the A/D converter is processed in an in-phase/quadrature-phase demodulator, wherein the quadrature I and Q baseband samples are calculated by the DSP with the digital SIF signal.

In another exemplary digital FM demodulation scheme, the DSP carries out the calculation using an arc-cosine look-up table to convert the digital SIF signal into a digital baseband composite signal.

In both of the foregoing exemplary digital FM demodulation schemes, the data of the SIF signal sampled by the A/D converter are desirably normalized before calculation is carried out by the DSP.

The above-described digital decoder systems require that an amplitude value of the SIF signal should be appropriately adjusted within a full-scale range of the A/D converter. Such adjustment can be effected manually during manufacture of the digital decoder system, or it can be done automatically with additional circuitry components, e.g., an auto-gain-controlled amplifier.

Thus, the digital FM demodulator including an A/D converter and a DSP still requires adjustment. In order to avoid the need for manual adjustment, additional circuitry is required, which can significantly increase the cost and complexity of the receiver, and reduce its reliability.

SUMMARY OF THE INVENTION

The present invention relates to circuitry for decoding multi-channel TV sound signals according to BTSC system specification, and to a multi-channel TV sound decoder including such circuitry.

In one aspect, the invention relates to a circuit for processing an analog audio signal for decoding, including:

a limiter arranged to receive an analog sound inter-carrier frequency signal from a tuner and to responsively produce a limited analog sound inter-carrier frequency signal;

a delay circuit connected to said limiter to delay the limited analog sound inter-carrier frequency signal and produce a delayed sound inter-carrier frequency signal; and a logic circuit connected to (i) the limiter to receive the limited analog sound inter-carrier frequency signal and (ii) the delay circuit to receive the delayed sound inter-carrier frequency signal, such logic circuit responsively producing a pulse width modulated SIF signal output that is decodable with a digital Broadcast Television System Committee (BTSC) decoder.

A further aspect of the invention relates to a circuit for processing an analog audio signal for decoding, including:

a limiter arranged to receive an analog sound inter-carrier frequency signal from a tuner and to responsively produce a limited analog sound inter-carrier frequency signal;

a delay circuit including a clocked shift register and arranged to perform an odd multiple of a 90-degree phase shift, connected to said limiter to delay the limited analog sound inter-carrier frequency signal and produce a delayed sound inter-carrier frequency signal;

a logic circuit including a Boolean logic XOR gate, connected to (i) the limiter to receive the limited analog sound inter-carrier frequency signal and (ii) the delay circuit to receive the delayed sound inter-carrier frequency signal, such logic circuit responsively producing a pulse width modulated SIF signal output that is decodable with a digital Broadcast Television System Committee (BTSC) decoder; and a low pass filter coupled to the logic circuit to filter the pulse width modulated SIF signal output that is decodable with a digital Broadcast Television System Committee (BTSC) decoder.

Other aspects of the invention relate to a multi-channel TV sound decoder including circuitry of the present invention.

Still other aspects of the invention relate to methods of decoding multi-channel TV sound signals using circuitry of the present invention.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
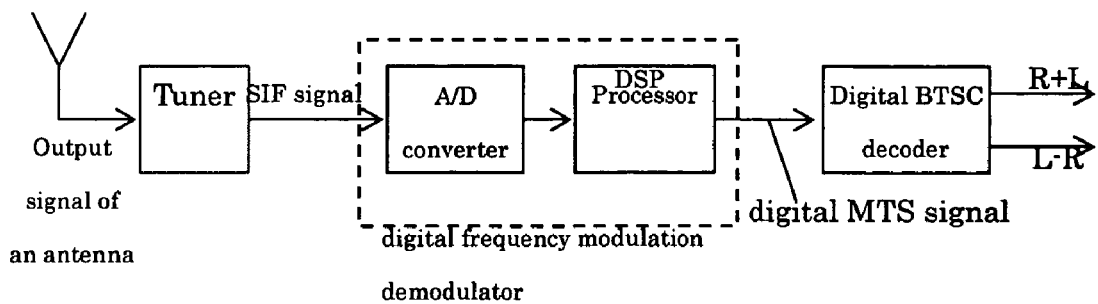
FIG. 1 is a schematic representation of a BTSC decoder system of the prior art.
Figure 2:
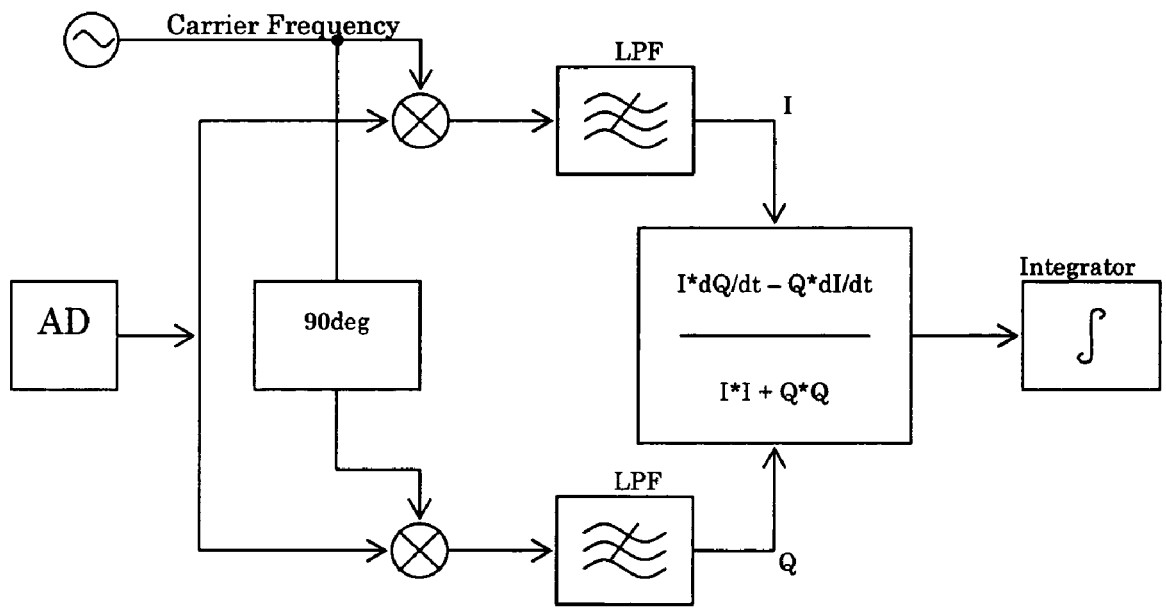
FIG. 2 is a schematic representation of an in-phase/quadrature-phase demodulator.
Figure 3:
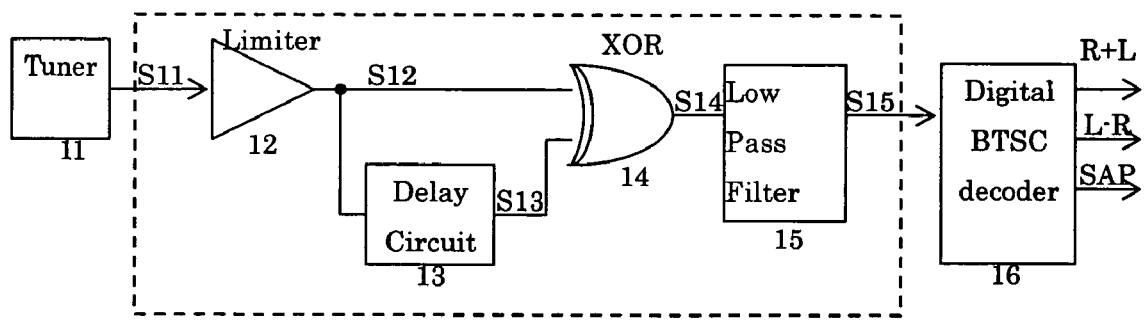
FIG. 3 is a schematic representation of a digital BTSC decoder system, including circuitry according to one embodiment of the present invention.

FIG. 3 shows a block diagram of the improved digital BTSC decoder system of the present invention.

The decoder comprises a circuit that includes a tuner 11 receiving a signal from an antenna (not shown in FIG. 3). The output of the tuner 11 is the SIF signal, which is inputted in line S11 to the limiter 12. The amplitude of the SIF signal is amplified in its swing and such signal is limited by the limiter 12. The resultantly limited SIF signal is passed in signal transmission line S12 to Boolean Exclusive Or (XOR) gate 14. A delay circuit 13 is provided in signal transmission line S13 connected at a first end to signal transmission line (S12) and at a second end to Boolean Exclusive Or (XOR) gate 14.

The delay circuit 13 is selected to perform a (2n+1) 90-degree phase shift at the carrier wave frequency of the SIF signal (the carrier wave frequency of such signal typically being 4.5 MHz), such circuit being arranged to perform an odd multiple on a 90-degree phase shift.

Figure 4:
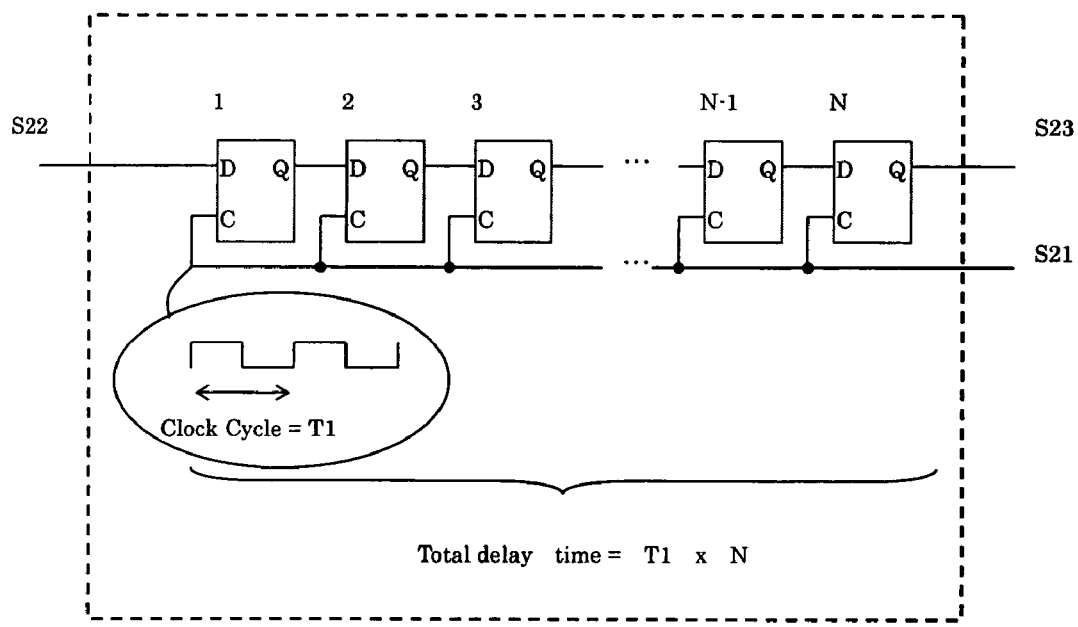
FIG. 4 is a schematic representation of a clocked shift register delay circuit usefully employed in the decoder of the invention.

FIG. 4 shows an exemplary delay circuit including a clocked shift register. In the FIG. 4 circuit, assuming that the number of D-flip flops in a clocked shift register is N and that the cycle of a pre-selected clock is T1, the input SIF signal (in line S22 in FIG. 4, and in line S12 in FIG. 3) is delayed for a period of between N times T1 and N+1 times T1, then is output as a delayed SIF signal (in line S23 in FIG. 4, and in line S13 in FIG. 3).

In order to perform a (2n+1) 90-degree phase shift with a clocked shift register, the sample from line S12 should be sampled with the same clock as that for a clocked shift register. A delayed SIF signal from the delay circuit 13 in line S13 and the limited SIF signal in line S12 are coupled through the Boolean Exclusive Or (XOR) gate 14 to a low pass filter 15. The digital signal in line S14 at the output of XOR gate 14 is essentially a pulse width modulated signal. Low pass filter 15 removes the carrier wave from the pulse width modulated signal transmitted to the low pass filter in line S14 and produces a demodulated signal that is output from the filter 15 in line S15. The low pass filter 15 preferably is a digital filter, and the output of low pass filter 15 is in digital form as a digital demodulated MTS signal output in line S15. Components of the MTS signal include the sum signal R+L and the amplitude modulated difference signal L−R. In the digital BTSC decoder 16, the digital MTS signal transmitted to the decoder in line S15 is broken up into its components: the sum signal R+L and, by amplitude demodulation, the difference signal L−R and, by frequency demodulation, monophonic SAP signal.

The digital BTSC signal processing circuitry of the invention thus affords an economic system solution for decoding multi-channel TV sound signals according to the BTSC system specification.

The invention provides a digital decoder using an FM demodulator without an A/D converter, thereby substantially reducing the number of external components and need for adjustment.

The digital BTSC signal processing circuitry of the invention is readily embodied in a single integrated circuit device, affording superior performance throughout the operating life of the circuit.

Although the invention has been described with reference to specific illustrative embodiments and arrangements, it will be appreciated that the invention may be practiced in other variant forms, with modification of the disclosed features, within the spirit and scope of the claims hereinafter set forth.

What is claimed is:

1. A circuit for processing an analog audio signal for decoding, comprising:
   a limiter arranged to receive an analog sound inter-carrier frequency signal from a tuner and to responsively produce a limited analog sound inter-carrier frequency signal;
   a delay circuit connected to said limiter to delay the limited analog sound inter-carrier frequency signal and produce a delayed sound inter-carrier frequency signal; and
   a logic circuit connected to (i) the limiter to receive the limited analog sound inter-carrier frequency signal and (ii) the delay circuit to receive the delayed sound inter-carrier frequency signal, said logic circuit responsively producing a pulse width modulated SIF signal output that is decodable with a digital Broadcast Television System Committee (BTSC) decoder.

2. The circuit of claim 1, further comprising a low pass filter connected to the logic circuit for filtering the pulse width modulated SIF signal.

3. The circuit of claim 1, wherein the delay circuit is arranged to perform an odd multiple on a 90-degree phase shift.

4. The circuit of claim 1, wherein the delay circuit includes a clocked shift register.

5. The circuit of claim 1, wherein the logic circuit includes a Boolean logic XOR gate.

6. The circuit of claim 1, as embodied in an integrated circuit device.

7. The circuit of claim 1, operatively coupled with a BTSC decoder.

8. The circuit of claim 1, operatively coupled with a tuner.

9. The circuit of claim 1, which is devoid of A/D converter components.

10. A circuit for processing an analog audio signal for decoding, comprising:

a limiter arranged to receive an analog sound inter-carrier frequency signal from a tuner and to responsively produce a limited analog sound inter-carrier frequency signal;

a delay circuit including a clocked shift register and arranged to perform an odd multiple of a 90-degree phase shift, connected to said limiter to delay the limited analog sound inter-carrier frequency signal and produce a delayed sound inter-carrier frequency signal;

a logic circuit including a Boolean logic XOR gate, connected to (i) the limiter to receive the limited analog sound inter-carrier frequency signal and (ii) the delay circuit to receive the delayed sound inter-carrier frequency signal, said logic circuit responsively producing a pulse width modulated SIF signal output that is decodable with a digital Broadcast Television System Committee (BTSC) decoder; and a low pass filter coupled to the logic circuit to filter the pulse width modulated SIF signal output that is decodable with a digital Broadcast Television System Committee (BTSC) decoder.

11. A multi-channel TV sound decoder comprising the circuit of claim 1.

12. A multi-channel TV sound decoder comprising the circuit of claim 10.

13. A method of decoding a multi-channel TV sound signal according to BTSC system specification, said method including use of a circuit as claimed in claim 1.

14. A method of decoding a multi-channel TV sound signal according to BTSC system specification, said method including use of a circuit as claimed in claim 10.

* * * * *